United States Patent [19]

Olsen

[11] 4,039,797

[45] Aug. 2, 1977

[54] BOTTOMLESS MICROWAVE BAKING UTENSIL

[76] Inventor: Dolores Olsen, 1992 Burleson Ave., Thousand Oaks, Calif. 91360

[21] Appl. No.: 657,881

[22] Filed: Feb. 13, 1976

[51] Int. Cl.² .............................................. H05B 9/06
[52] U.S. Cl. .............................. 219/10.55 E; 99/416; 99/448; 219/10.55 F; 426/243
[58] Field of Search ................. 219/10.55 E, 10.55 F, 219/386, 387, 444; 220/20, 23.8, 21, 22, 354, 380, 370; 99/430, 426, 433, 439, DIG. 14, 416, 448; 126/390; 426/107, 114, 113, 119, 241, 243, 234

[56] References Cited

U.S. PATENT DOCUMENTS

| 2,188,558 | 1/1940 | Smith | 99/430 X |
| 3,240,610 | 3/1966 | Cease | 426/114 X |
| 3,615,713 | 10/1971 | Stevenson | 426/107 |

Primary Examiner—Arthur T. Grimley
Attorney, Agent, or Firm—Dennis L. Mangrum

[57] ABSTRACT

The present invention is a utensil for cooking bakery products in microwave ovens. The utensil is fabricated from essentially microwave transparent material and is constructed without a bottom, thereby providing a utensil for cooking bakery products uniformly throughout. The utensil is also constructed so as to be rotatable within the oven cavity so as to permit optimum use of the microwave energy pattern.

10 Claims, 7 Drawing Figures

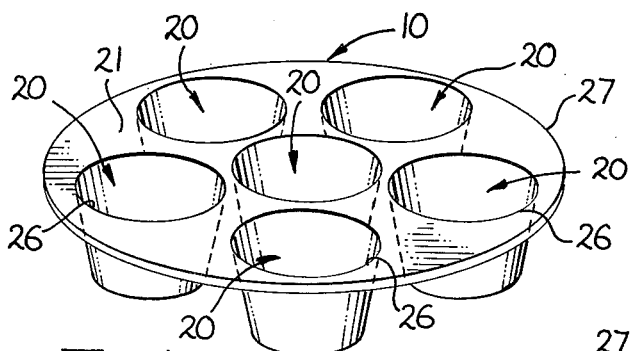
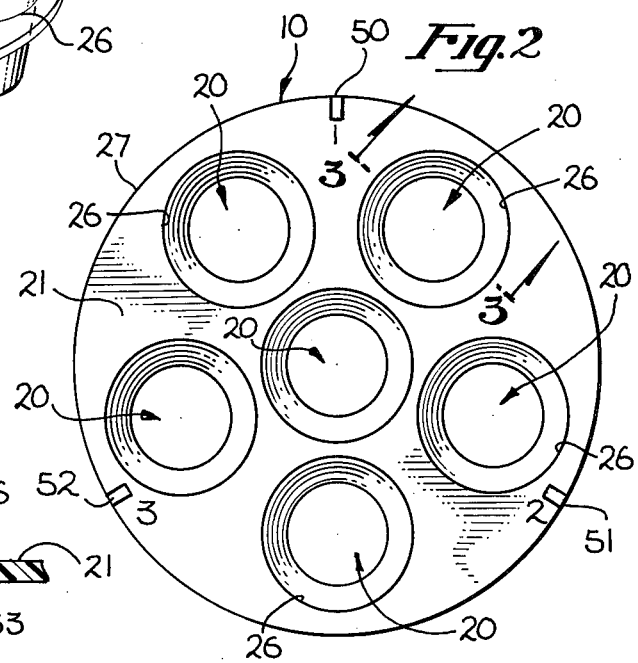
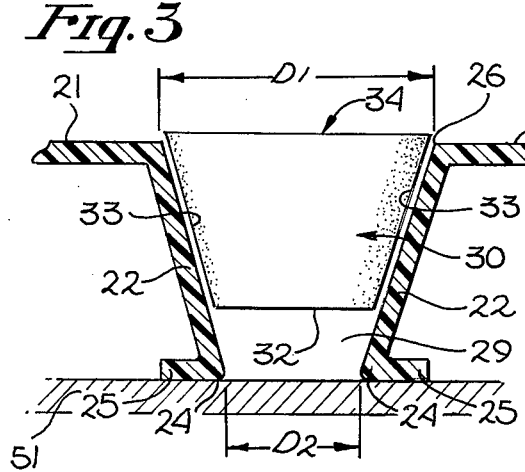
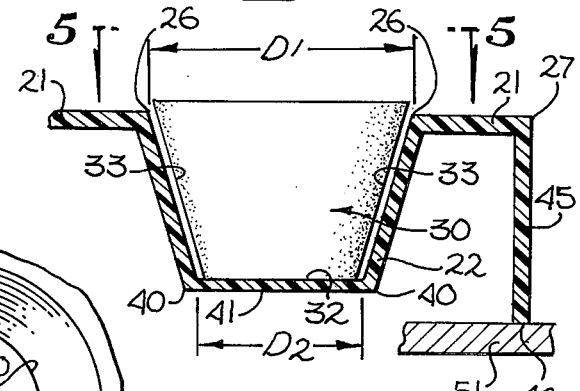
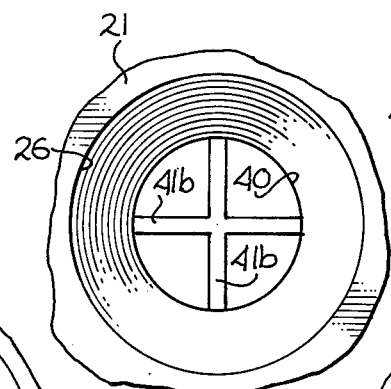
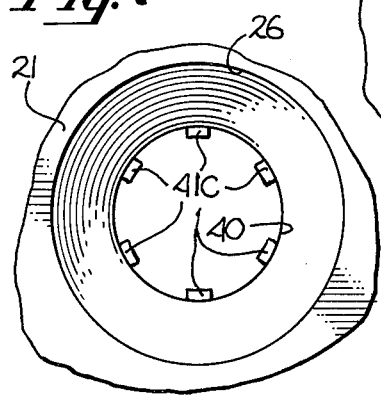

BOTTOMLESS MICROWAVE BAKING UTENSIL

BACKGROUND OF THE INVENTION

1. Field of the Invention

The invention relates to a baking utensil for use in microwave cooking.

2. Description of the Prior Art

The preparation of food using microwave energy has become popular in recent years due to the fast preparation times available to the user. It has been found, however, that cooking techniques employed in conventional-type thermal ovens are not satisfactory in microwave applications. For instance, the normal surface coloration or browning of many items does not occur in microwave ovens and in addition, the depth of penetration of cooking will vary with different ovens and items to be cooked. Another factor that needs to be considered in microwave cooking is the cooking utensil. The cooking utensils are important since microwave energy is substantially shielded and reflective by conductive metallic materials which are normally used for cooking utensils in most ovens. Other cooking utensils such as glass or plastic are preferred for microwave cooking since they are essentially transparent to microwave energy.

In microwave cooking the load placed within the oven enclosure is heated due to the interaction of the microwave fields within the load or material being cooked. In accordance with the so-called dielectric heating phenomena, the molecules tend to oscillate under the influence of high-frequency electromagnetic energy fields. The friction created by the molecular movement causes the material or load to be heated and cooked.

In recent times, numerous microwave cooking utensils have been developed. A few of the more pertinent one are described below. U.S. Pat. No. 3,302,632 issues to E. C. Fichtner is a plastic-type container having different cooking areas within the container. The container has microwave regulating material embedded in various portions of the walls to alter the microwave conductivity and permit microwave transmission in certain wall portions while providing different microwave cooking rates in other areas. This device permits the use of the utensil for cooking different items either at the same time or concurrently with other items. This is necessary to permit the cooking of different objects at different rates.

U.S. Pat. No. 3,845,266 issued to Palmer P. Derby discloses a member for supporting the item to be cooked in a microwave oven. The supporting member is designed to have a nonpermeable, nondissipative material having a plurality of frequency responsive impedance matching energy transparent structures to expose a load to varying degrees of heat. Thus the heating pattern results in browning and searing in the areas of intense energy transmission. The disclosure also describes the use of a container or utensil which is substantially transparent to microwave energy such as glass or Pyrex.

The foregoing disclosures are designed to provide for selective heating and have been reasonably successful in cooking certain items with microwave energy. A need, however, exists for simple, less costly microwave cooking utensils which can be used to cook bakery goods. The utensil cannot easily crack due to overheating or uncontrolled temperature rise during usage and should be relatively simple to use and store with conventional cooking utensils.

At the present time there is no known device in the prior art which will permit the effective uniform cooking of bakery goods in a microwave oven. The present invention discloses an effective bottomless cooking utensil for cooking bakery goods. However, there are known in the prior art trays which disclose some of the physical features of the present invention, but there exists no known cooking utensil for cooking bakery products as disclosed herein.

U.S. Pat. No. Des. 169,759 issued to R. B. Karoff discloses a combined food and beverage rack wherein a cross formed of metal or plastic is used to support the glasses disposed within the tray. U.S. Pat. No. 855,565 issued to Jay Greenhouse also discloses a carrying tray which has several apertures cut through an upper surface through which glasses or bottles may be disposed. It also discloses the use of flexible spring tabs for grasping the sides of the bottles or tumblers when disposed in the tray. However, Greenhouse also discloses the necessity of having a bottom-support surface which is solid for supporting the glass or bottle.

The present invention provides a device for cooking bakery products in microwave ovens that is unknown in the prior art.

SUMMARY OF THE INVENTION

A cooking utensil for use in baking bakery products in microwave ovens is disclosed. The utensil is capable of being rotatably disposed in a microwave oven. Said utensil is formed having an upper surface with at least one aperture therein, said aperture havig tapered narrowing side walls thereby forming a partial conical cavity. The exposed end of said side walls is flared outward forming a base upon which said utensil is supported during baking. A baking cup filled with batter can be disposed in said bottomless conical cavity and be supported by the conical side walls during baking without the bottom of said baking cup contacting any supporting element.

It is an object of the present invention to provide a utensil for uniformly baking bakery products in a microwave oven.

It is another object of the present invention to provide a baking utensil which can be easily rotated into various positions during baking and thoroughly permit optimum use of the microwave energy pattern in the oven cavity.

BRIEF DESCRIPTION OF THE DRAWING

FIG. 1 is a perspective view of the preferred embodiment of the bakery-cooking utensil;

FIG. 2 is a top view of the upper surface of the bakery-cooking utensil;

FIG. 3 is a cross-sectional taken along line 3—3 of FIG. 2 illustrating the preferred form for forming the microwave cooking utensil;

FIG. 4 is a cross-sectional view taken along 3—3 of FIG. 2 illustrating an alternate form of forming the microwave cooking utensil;

FIG. 5 is a top view taken along line 5—5 of FIG. 4 illustrating a bottom support element;

FIG. 6 is a cross-sectional view taken along line 5—5 of FIG. 4 illustrating an alternate form of a supporting element; and, FIG. 7 is a top view taken along line 5—5 of FIG. 4 illustrating the second alternate supporting element.

DETAILED DESCRIPTION OF THE PREFERRED EMBODIMENT

The present invention is shown in perspective view in FIG. 1. The preferred form of the present invention is used as described herein for baking bakery products such as cupcakes. It is understood, however, that the invention is not limited solely to utensils for cooking bakery products such as cupcakes, but may be used for cooking bread, pastries and other forms of bakery porducts in microwave ovens.

In the preferred form, the present invention is used to cook cupcakes in a microwave oven. In most microwave ovens it takes approximately three minutes to bake six cupcakes. If more cupcakes are placed within a conventional microwave oven, the baking time will increase and the efficiency of baking will considerably decrease. Thus, the preferred form of the present invention is described in detail with particular reference to the cooking utensil for baking six cupcakes at one time in a microwave oven. It should be understood, however, that that particular use is only one form of the invention and that that form could be altered to increase or decrease the number of cupcakes to be baked.

The preferred form of the invention will now be described in reference to FIGS. 2 and 3. The upper surface 21 of the cooking utensil 10 is circular in shape and generally flat. Six conical cavities 20 are formed in the utensil 10 as will be described herein below and in reference to FIG. 3. The conical cavity 20 is formed having an upper ridge rim 26 with a diameter D1. Tapered narrowing side wall 22 is coupled to the upper surface 21 at rim 26. The side wall is formed such that the bottom end terminates at rim 24, forming an opening with a diameter D2 smaller than diameter D1. A base member 25 is coupled to the end of side wall 22 at rim 24 thereby forming a platform or base for supporting the cooking utensil 10.

The method for forming one of the conical cavities 20 in the cooking utensil 10 has been previously described. In the preferred form each of the conical cavities 20 is formed in a similar manner. The cooking utensil 10 could be constructed from glass, plastic, or other microwave transparent material. It could be formed by cast molding or piece assemblage.

The angle of inward slope of side wall 22 is predetermined for each different bakery product to be baked. The function of the inward sloped sidewalls is to support the baking cup disposed therein. In the presently preferred form used for baking cupcakes, the side wall is sloped such that a standard two-and-a-half inch baking cup 33 can be employed. When the cup 33 is disposed into conical cavity 20 as shown in FIG. 3, the cup 33 will be generally supported by its contact with side wall 22, and the top 34 of the baking cup will project only slightly above surface 21. In the preferred form, the bottom 32 of cup 33 is not supported in any way. The exposed bottom permits a bakery product to be effectively and uniformly baked in a microwave oven.

It has been found in cooking with microwave energy if the bottom 32 of the baking cup 33 is resting on the supporting shelf or a supporting base member of the cooking utensil, the cupcake will bake in undesireable manners. For example, in most instances, the bottom of the cupcake will stay doughy or unbaked while the top will have air holes formed therein. However, when the bottom of the utensil is eliminated and the baking cup is exposed and unsupported the cupcakes will bake completely throughout and no air holes will be formed therein. In other instances where utensils for baking directly support or permit the baking cup to rest on the supporting shelf, it has been found that the batter may bake so rapidly that the dough does not have time to rise. In that case the batter may overflow the baking cup 33. It has also been found that even when microwave transparent material such as plastic and glass are used to form the cooking utensil 10, the bubbling, burning and improper baking result when the bottom of the bakery cup is either disposed directly on the supporting shelf 51 or is supported by the utensil itself.

The preferred form of the invention as described is designed such that a space 29 exists between the bottom 32 of the baking cup 33 and the base 25 of the cooking utensil 10.

The presently preferred embodiment and use of the invention has been described in reference to FIGS. 2 and 3. An alternate form of the preferred embodiment is shown in FIG. 4. In the alternate embodiment, the upper surface 21 is coupled to an outer peripheral wall 45 at rim 27. The outer peripheral wall 45 is formed such that its lower end 46 rests on shelf 51 and thereby supports the cooking utensil 10. In this embodiment the outer peripheral wall serves to support the utensil 10 on shelf 51. The side wall 22 of the conical cavity 20 is formed as in the preferred embodiment, but terminates to form an aperture with a diameter D2 terminated at rim 40. A partial base member 41 is coupled to side wall 22 at rim 40.

The partial base member in this embodiment 41 serves partially to support the baking cup 33. The partial base member 41 is not required in most baking operations. However, when bakery products larger than cupcakes are baked, the additional support provided by the partial base member 41 may be required. The partial base member 41 may be formed in several different ways. A first form is shown in FIG. 5. The partial base member 41a is a continuous strip coupled between opposite sides of rim 40 disposed so as to bisect the lower aperture. In FIG. 6 a second alternate form of a partial supporting base member 41 is shown. There two relatively straight members 41b are shown coupled to rim 40, intersecting so as to form a cross and thereby serve as a supporting surface. In FIG. 7, a third form of the partial base member 41 is shown. The partial supporting member 41 is shown as tabs 41c. The tabs 41c are disposed about the inner periphery of rim 40 and project into aperture 29 thereby forming a ledge for supporting the baking cup 33.

The partial supporting member 41 as previously described is used to provide support for the uncooked bakery dough and baking cup. It should be noted that these are only three (3) specific forms of partial supporting members. Other forms may also be used to support the baking cup while permitting the bottom 32 to be relatively open to permit uniform, complete baking. It should be noted, however, that the preferred form is illustrated in FIG. 3 and is completely bottomless. The preferred form is especially useful for baking small bakery products such as desserts and cupcakes. In applications where larger bakery products are to be cooked, such as bread and the like, a partially supported bottom as previously described may be required to support the uncooked item.

The design and construction of microwave ovens requires a very sophisticated skill. The oven cavities, the microwave generating device and the wave guide channels are all combined such that they create a standing wave pattern of microwave energy within the oven cavity. The standing wave pattern is three-dimensional and has peaks and knolls. Thus, different portions of the oven bake at different rates. Most manufacturers of microwave ovens have attempted to alter the standing wave pattern of the microwave energy by introducing stirring devices which constantly alter the relative position of the peaks and knolls of the standing wave pattern and thereby permit uniform baking. Theoretically, these stirring devices alter the standing wave pattern; however, in practice it has been found that some portions of every microwave oven bake more rapidly than other portions. The present invention is designed and constructed to compensate for this irregular type of baking. The irregular baking patterns are especially critical in the baking of bakery products because of their sensitivity to heat.

The present invention attempts to solve this problem by providing a circular utensil which can be rotated during the baking cycle. All prior known baking utensils are rectangular and are incapable of being rotated within the small microwave oven cavity. Therefore, the present invention is also provided with reference numerals for use cooking. Since specific reference is being made to baking cupcakes, that reference will continued. It takes three minutes to bake six cupcakes. The upper surface of utensil 10 has been marked with three reference numerals 50, 51, and 52. When the utensil is placed in the oven and the microwave energy is activated, the reference numeral 1, labeled 50, is disposed nearest a known position. At the end of one minute time, the device is rotated within the oven such that reference numeral 2, labeled 51, is disposed near the reference point. At the end of the second minute, the cooking utensil 10 is again rotated until the reference numeral 3, labeled 52, is disposed in alignment with the known reference point. In this manner all of the cupcakes are rotated to different positions within the oven cavity. This permits uniform cooking since the individual bakery products are exposed to different portions of the standing microwave energy field. In uses for other bakery products, more than three reference numerals may be needed to permit proper identification for different baking periods. The above reference is especially useful for baking cupcakes and is described for illustration purposes only.

It should be noted that the present invention is described as being hand rotated during baking. It is possible to provide a stand capable of mechanically rotating the utensil without detracting from the spirit or scope of the invention.

The present invention has been described in particular reference to the cooking of bakery products and more specifically to cupcakes within a microwave oven. It should be re-emphasized that similar utensils for other bakery products could be formed in different sizes and in different geometrical relationships while providing the basic structure heretofore described. The device of the present invention can be constructed from glass, Pyrex, or other suitable materials, but is particularly useful when made of a heavy gauge plastic which is not breakable and is transparent to microwave energy.

However, while the preferred embodiment of the present invention has been described in detail herein, it will be understood by those skilled in the art, that various changes in form and detail may be made therein without departing from the spirit and scope of the invention.

I claim:

1. A cooking utensil for use in combination with a microwave heating apparatus, comprising an upper surface member having at least one aperture therein, said aperture being defined by a tapering, narrowing wall and forming a cavity wherein the width of said aperture at said upper surface member is larger than the width of said aperture at the lower end of said tapering, narrowing wall, said tapering, narrowing wall capable of receiving and supporting a baking cup disposed therein such that the bottom of said baking cup is unsupported.

2. A cooking utensil for baking in combination with a microwave heating apparatus, comprising; an upper surface member having at least one aperture therein, said aperture being defined by a tapering, narrowing wall thereby forming a bottomless, partial, conical cavity, said side wall capable of supporting a baking cup disposed in said partial, conical cavity such that the bottom of said baking cup is suspended above the lower end of said side wall, said utensil formed from microwave transparent material.

3. The cooking utensil of claim 2 wherein a partial supporting member is disposed near said lower end of said tapering, narrowing wall for providing support for said baking cup.

4. The cooking utensil of claim 2 wherein a peripheral supporting member is coupled to said upper surface for supporting said cooking utensil.

5. The cooking utensil of claim 2 wherein the bottom of said side wall is capable of supporting said cooking utensil.

6. The cooking utensil of claim 2 wherein reference numerals are disposed on said upper surface for indicating relative position of said utensil during cooking.

7. The cooking utensil of claim 2 wherein a partial supporting member is disposed across said conical cavity for providing support for said baking cup.

8. The cooking utensil of claim 7 wherein said partial supporting member is formed from a single rail-like member.

9. The cooking utensil of claim 7 wherein a partial supporting member is formed from an intersecting pair of raillike members.

10. The cooking utensil of claim 7 wherein a partial supporting member is formed from a plurality of projecting tablike members.

* * * * *